UNITED STATES PATENT OFFICE.

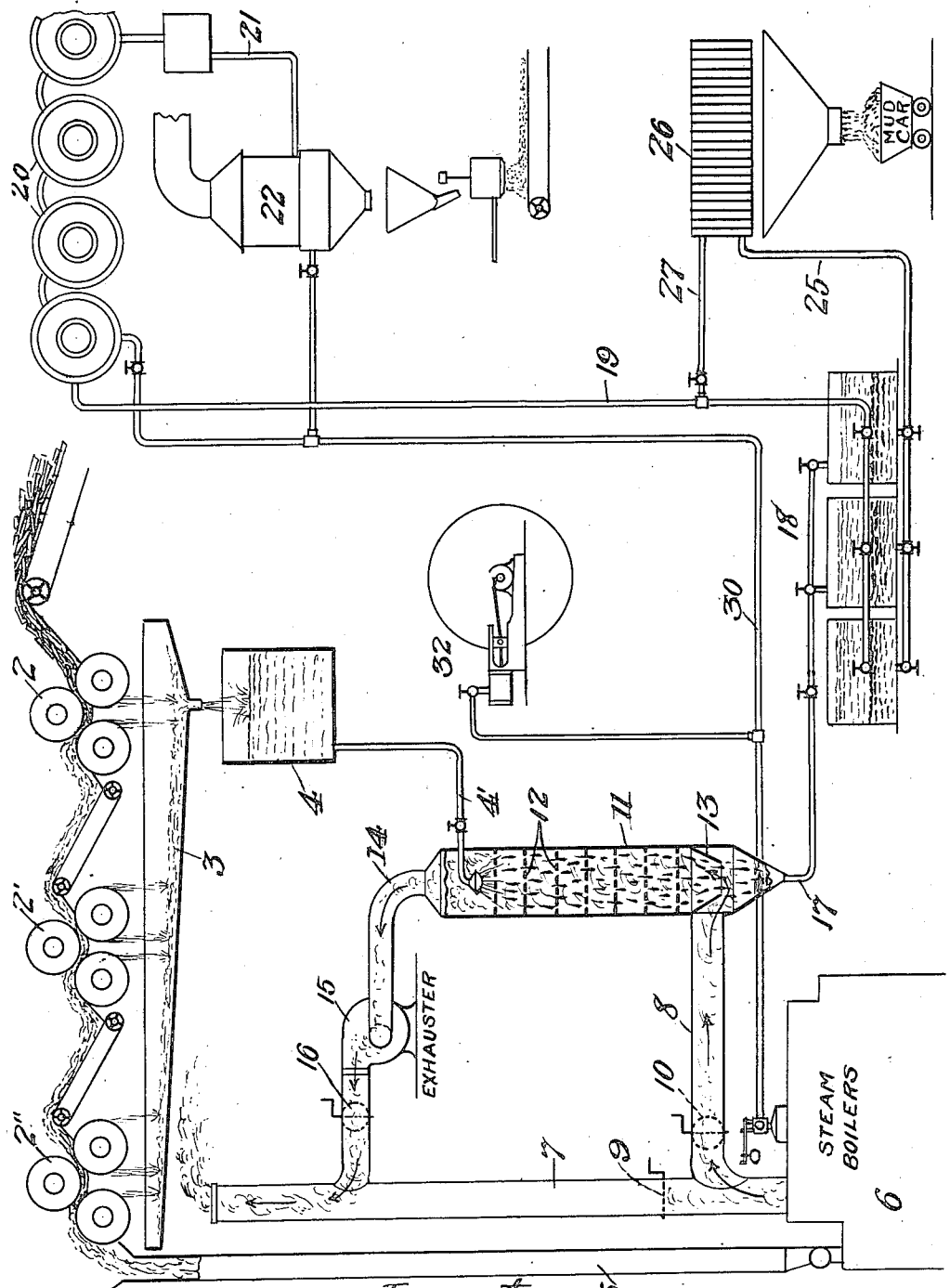

ALFRED KRAFFT, OF HONOLULU, TERRITORY OF HAWAII.

METHOD OF TREATING RAW SUGAR-JUICES.

1,271,914.  Specification of Letters Patent.  Patented July 9, 1918.

Application filed March 7, 1917, Serial No. 153,018. Renewed December 1, 1917. Serial No. 205,002.

*To all whom it may concern:*

Be it known that I, ALFRED KRAFFT, a subject of the King of Great Britain, residing at Honolulu, Territory of Hawaii, have invented certain new and useful Improvements in Methods of Treating Raw Sugar-Juices; and I do hereby declare the following to be a full, clear, and exact description of the invention, such as will enable others skilled in the art to which it appertains to make and use the same.

This invention relates to the treatment of sugar juices as the same are delivered from the crushing rolls, and preferably after the juices have been submitted to the usual liming operation, and consists essentially in subjecting the juices to the direct action of hot flue gases, such as are delivered from a steam boiler or other similar furnace, the juices preferably being brought into direct and intimate contact with the products of combustion, in spray-like form, the action of the flue gases producing certain marked advantageous effects, hereinafter enumerated, which result in material economies in the operation of sugar mills, as will be more particularly described hereinafter.

The accompanying drawing is a diagrammatic illustration of a modern sugar mill, involving apparatus for carrying out the present invention.

Referring to the drawings, 1 indicates the usual form of conveyer which delivers the cane to the roller mills 2, 2' and 2", which may be of any preferred form, which mills crush and comminute the cane and extract the raw juices therefrom, which latter are delivered into the usual juice pan 3, whence said juices flow into the usual liming and weighing tank 4.

The waste or bagasse from the crushing rolls passes by way of the feed chute 5 to the furnaces of a battery of steam boilers 6, which develop the steam necessary for the operation of the plant. The steam boiler furnaces are connected with the usual stack or chimney 7, which is provided with a damper or cut-off valve 9. The stack 7 is provided with a lateral branch 8 below the damper 9, which, in turn, is provided with a similar damper or cut-off 10. The discharge end of the lateral flue 8 is connected with an apparatus designed to bring the flue gases or products of combustion from the steam boiler furnaces into direct and intimate contact with the sugar juices delivered from the liming tank 4, said apparatus preferably comprising a vertical cylindrical vessel or container 11 provided with a series of perforated grids or grates arranged one above the other throughout the length of the container 11, so that the juices delivered to the container by pipe 4', provided with a spray head centrally disposed within the upper portion of the container, will be passed downward in spray-like form through the grids, while the products of combustion are passing upward through said container, the upward draft being augmented, if necessary, by means of an exhaust fan 15 interposed in the outlet conduit 14 from the top of the container and connected to the stack 7, said conduit 14 being provided with a suitable damper or cut-off 16 beyond the fan 15. The lower portion of the container 11 is provided with a conical baffle 13 adjacent the outlet of flue 8, and the lower conical end of said container is connected with the discharge pipe 17, which is connected with the usual settling or decantation tanks 18.

From the upper portions of said settling tanks, a pipe 19 leads to the usual battery of quadruple effect evaporators 20, from whence the juices pass by way of pipe 21 to vacuum pans 23. From the lower portions of the settling tanks, a pipe 21 leads to the usual filter presses 26, and from the latter a pipe 27 connects with the pipe 19 leading to the evaporators.

The steam from the boiler 6 is supplied by the usual steam line 10 to an engine 32 for operating the various elements of the mill and also for supplying the necessary heat to the evaporators 20 and the vacuum pans 22, as will be understood.

In carrying out the invention, the damper 9 in the stack 7 is moved to closed position, and the dampers 10, in flue 8, and 16, in exhaust flue 14, are opened, thereby causing the products of combustion, resulting from the burning of the bagasse in the steam boiler furnaces, to pass upward through the container 11, where said products of combustion meet and are intimately admixed with the descending shower-like current of raw sugar juices from the liming tank 4, after which the products of combustion are discharged through conduit 14 by means of exhaust fan 15, into the stack 7.

According to the practice hereinbefore prevailing in sugar mills, it was customary to exhaust the flue gases or products of combustion from the furnaces directly into the stack, and to employ a portion of the steam generated in the boilers in a special form of juice heater to preliminarily heat the juices delivered to the heater from the liming tank. This resulted not only in the total loss of the heat carried by the flue gases, but also entailed an additional element of expense represented by the steam employed to heat the juices in the juice heater to a degree sufficient to effect clarification of the juices in the settling tanks. The present invention, however, enables the usual form of juice heaters, constructed like an ordinary surface condenser, to be entirely dispensed with and supplanted by the vessel or container 11 in which the juices are brought into direct and intimate contact with the products of combustion from the steam boiler furnaces. Upon first consideration, it would naturally occur to the sugar engineer that the bringing together of the smoky flue gases and the raw sugar juices would prove injurious, if not destructive, to the juices, but practical demonstration on a commercial scale has proven that the results are directly the reverse, and evidences a materially improved condition of the juices for subsequent treatment, as well as marked economy in the operation of the mill as a whole.

In the waste flue gases from a bagasse fire, fine particles of ash and carbonized cane fiber are always present, and it has been found that the latter, especially when mixed directly with the mill juices, acts as a decolorizing agent, and also as an absorbent for the lighter flocculent matter found in all cane juices and consisting principally of gums and waxes. This mixing of the solid matter contained in the flue gases directly with the mill juices, therefore, results in the production of a lighter colored juice from which a higher grade of sugar is obtained than is usually made by the processes heretofore in vogue. Another advantage gained by the admixture of the solid matter contained in the flue gases with the juices is due to the fact that the solid particles, which are carried along with the juices discharged from the heater, constitute a filtering medium, with the result that a materially improved decantation and filtration is obtained in the settling tanks and in the filter presses, and practically all of the solid and mechanically suspended impurities contained in the juices are more readily removed than heretofore.

A still further improvement in the clarification of the mill juice is directly predicable upon the chemical action of the juices by the carbonic acid gas ($CO_2$) in the flue gases. It is known that over-liming the raw juices results in a better subsequent clarification than can be otherwise obtained, and by utilizing the large quantities of carbonic acid in the flue gases as a saturant for the limed juices, any desired degree of over-liming may be practised with the assurance that the otherwise objectionable condition will be corrected in the heater by the $CO_2$ present.

One of the most important advantages of the present invention, however, resides in the practical utilization of the heat remaining in the products of combustion or flue gases, which heat had heretofore been permitted to go to waste. Assuming that bagasse is employed as the fuel for the steam boiler furnaces, not only is the heat in the products of combustion thereof rendered available, but the water in the form of steam in the flue gases also performs a desirable and economical function of heating and evaporating the water content of the juices, so that the latter are delivered from the heater in materially concentrated form. Bagassee is roughly composed of about 50% moisture, and the balance of fiber and a small percentage of sugar and non-sugars, and the resulting products of combustion, assuming an air supply to the furnaces 100% in excess of that theoretically necessary, will be for each pound of bagasse fired, as follows:—

| | |
|---|---|
| Steam | .79 lbs. |
| Air | 2.48 lbs. |
| $CO_2$ | .79 lbs. |
| Nitrogen | 1.92 lbs. |
| Total | 5.98 lbs. |

From this tabulation, it will be seen that there results 5.19 lbs. of flue gases and .79 lbs. of water in the form of steam for every pound of bagasse burned, or a total of 5.98 lbs. of hot flue gases and steam available not only for heating the sugar juices, but for carrying off a material proportion of the water contained in said juices. It is well known that air and other gases have a capacity for absorbing moisture, which increases with the temperature of the gases, and as each pound of bagasse burned produces only .79 lbs. of vapor for each 5.98 lbs. of total evolved, it will be apparent that there is available a large water-carrying capacity in the heated flue gases for absorbing moisture from the mill juices which are brought into direct and intimate contact with said gases in the apparatus as shown. It will, therefore, be seen that in addition to the heating of the sugar juices by direct contact with the flue gases, there results the very material advantage of a partial evaporation of the water content of the juices, and a consequent concentration of the juices, due first to the absorption by the hot flue gases of watery vapors from juices up to or near saturation of the gases, and second, the evaporation due to raising the juices to approximately the boiling point at or near the bottom of the apparatus by direct contact with the hottest portions of said flue gases, where the latter enter the container 11.

A still further advantage of the process is the resultant economy in fuel necessary to generate steam in the boilers. In actual practice, it is found that the bagasse resulting from the usual run of sugar cane does not provide sufficient fuel to generate steam to operate all of the apparatus of the sugar mill, so that it has been customary to provide additional fuel in the form of wood or the like, which is fed to the boilers with bagasse, in order to generate adequate quantities of steam. It has been demonstrated that the old type of juice heater absorbed substantially 23% of the steam necessary to operate the mill. The elimination of these juice heaters and the substitution of the apparatus for heating the juices by direct contact with the hot products of combustion renders available for other purposes, the steam which was heretofore employed in operating the juice heaters. This means, obviously, that less steam will have to be developed, by at least 23%, which will bring the amount of steam required within the steam generating capacity of the bagasse supply of the mill, so that no extra fuel is necessary, but an actual surplus of bagasse results which may be employed for other useful purposes.

It will also be apparent that inasmuch as a certain percentage of moisture is extracted from the juices as the latter are subjected to the hot products of combustion, the juices delivered to the quadruple effect evaporators will have already been concentrated or evaporated to a material degree, which will, therefore, result in a material saving in the amount of steam required by said quadruple effect evaporators.

What I claim is:—

1. The method of treating sugar juices which comprises subjecting the same to direct contact with products of combustion from a boiler furnace or similar heat source.

2. The method of treating sugar juices which comprises subjecting the same in shower-like form to direct contact with products of combustion from a boiler furnace or similar heat source.

3. The method of treating sugar juices which comprises showering said juices through a rising current of flue gases from a steam boiler furnace or the like.

In testimony whereof I affix my signature.

ALFRED KRAFFT.